(12) United States Patent
Neumann et al.

(10) Patent No.: US 9,027,243 B2
(45) Date of Patent: May 12, 2015

(54) METHOD AND SYSTEM FOR REPLACING A SINGLE WIND TURBINE BLADE

(71) Applicant: General Electric Company, Schenectady, NY (US)

(72) Inventors: Ulrich Werner Neumann, Simpsonville, SC (US); Charles Van Buchan, Greer, SC (US); Blake Allen Fulton, Simpsonville, SC (US); Vishan Rashmi Kulasekera, Simpsonville, SC (US); Bradley Graham Moore, Greenville, SC (US); Esat Sadi Yenigun, Greenville, SC (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 13/658,359

(22) Filed: Oct. 23, 2012

(65) Prior Publication Data
US 2014/0109407 A1 Apr. 24, 2014

(51) Int. Cl.
*B23P 6/00* (2006.01)
*F03D 1/00* (2006.01)

(52) U.S. Cl.
CPC ............... *F03D 1/001* (2013.01); *F03D 1/003* (2013.01); *F05B 2230/61* (2013.01); *F05B 2230/70* (2013.01); *F05B 2230/80* (2013.01); *Y02E 10/728* (2013.01); *Y10T 29/49318* (2015.01); *Y10T 29/53* (2015.01)

(58) Field of Classification Search
CPC ............ B23P 6/00; B23P 9/00; B66C 1/108; F03D 1/001; F03D 1/003; F03D 11/04; F03D 11/005; F03D 11/0066; F03D 11/0075; F05B 2230/70; F05B 2230/80; Y02E 10/726
USPC .......................... 29/407.1, 426.3, 889.1, 700
See application file for complete search history.

(56) References Cited

U.S. PATENT DOCUMENTS

| | | | |
|---|---|---|---|
| 742,447 A | 10/1903 | Kidder |
| 2,654,638 A | 10/1953 | Elliott |
| 2,782,436 A | 2/1957 | Tomer |
| 2,873,089 A | 2/1959 | Porter |
| 3,117,401 A | 1/1964 | Talley |
| 3,504,767 A | 4/1970 | Sherman |
| 3,520,383 A | 7/1970 | Loock |
| 3,727,723 A | 4/1973 | Pitcairm et al. |

(Continued)

FOREIGN PATENT DOCUMENTS

| | | |
|---|---|---|
| DE | 19741988 A1 | 4/1999 |
| DE | 10336392 A1 | 3/2005 |

(Continued)

OTHER PUBLICATIONS

N.A., "Self-Hoising Crane: Changing Gearbox, Generator, Rotor and Main Shaft", LIFTRA, Jan. 31, 2013, 1-5.

(Continued)

*Primary Examiner* — Alexander P Taousakis
(74) *Attorney, Agent, or Firm* — Cantor Colburn LLP

(57) ABSTRACT

A method of replacing a wind turbine blade includes suspending the wind turbine blade from support hub of a wind turbine, connecting one or more cable climbing members between the support hub and the wind turbine blade, and lowering the one or more cable climbing members and the wind turbine blade from the support hub.

8 Claims, 8 Drawing Sheets

(56) References Cited

U.S. PATENT DOCUMENTS

| | | | |
|---|---|---|---|
| 4,008,785 | A | 2/1977 | Mugnaini |
| 4,286,417 | A | 9/1981 | Shelton |
| 5,226,973 | A | 7/1993 | Chapman et al. |
| 5,351,783 | A | 10/1994 | Celli |
| 5,685,393 | A | 11/1997 | Early |
| 5,743,969 | A | 4/1998 | Lawler |
| 6,079,517 | A | 6/2000 | Payne |
| 6,364,609 | B1 | 4/2002 | Barnes |
| 7,198,134 | B2 | 4/2007 | LeMieux |
| 7,207,777 | B2 | 4/2007 | Bervang |
| 7,360,310 | B2 | 4/2008 | Bagepalli et al. |
| 7,726,941 | B2 | 6/2010 | Bervang |
| 7,735,808 | B2 | 6/2010 | Viladomiu i Guarro et al. |
| D632,221 | S | 2/2011 | Bogaert |
| 7,927,445 | B2 * | 4/2011 | Zheng et al. ............ 156/187 |
| 8,057,605 | B2 | 11/2011 | Gallegos |
| 8,743,196 | B2 * | 6/2014 | Fritz et al. ............... 348/92 |
| 2006/0151767 | A1 | 7/2006 | Wobben |
| 2006/0175465 | A1 | 8/2006 | Teichert |
| 2007/0056801 | A1 | 3/2007 | Iversen |
| 2007/0151194 | A1 | 7/2007 | Livingston et al. |
| 2007/0290426 | A1 | 12/2007 | Trede et al. |
| 2008/0105491 | A1 | 5/2008 | Prout |
| 2008/0203246 | A1 | 8/2008 | Ingram et al. |
| 2008/0307647 | A1 | 12/2008 | Kessler |
| 2010/0028152 | A1 | 2/2010 | Numajiri et al. |
| 2010/0132137 | A1 | 6/2010 | Eggleston |
| 2010/0139062 | A1 | 6/2010 | Reed et al. |
| 2010/0254813 | A1 * | 10/2010 | Dawson et al. ............ 416/146 R |
| 2011/0138937 | A1 | 6/2011 | Fritz |
| 2011/0173811 | A1 | 7/2011 | Iversen |
| 2012/0003089 | A1 | 1/2012 | Byreddy et al. |
| 2012/0073134 | A1 * | 3/2012 | Bywaters et al. ............ 29/889.1 |
| 2012/0328442 | A1 * | 12/2012 | Davis ...................... 416/204 R |
| 2013/0236316 | A1 * | 9/2013 | Bitsch et al. ............... 416/204 R |
| 2013/0239491 | A1 * | 9/2013 | Tadayon .................... 52/123.1 |
| 2013/0318789 | A1 * | 12/2013 | Gabeiras et al. ............ 29/889.7 |
| 2014/0010661 | A1 * | 1/2014 | Hancock .................... 416/207 |
| 2014/0150227 | A1 * | 6/2014 | Teichert ..................... 29/23.51 |

FOREIGN PATENT DOCUMENTS

| | | | |
|---|---|---|---|
| EP | 1239150 | A2 | 9/2002 |
| EP | 1886904 | A2 | 2/2008 |
| EP | 2369174 | A1 * | 9/2011 |
| GB | 2356355 | A | 5/2001 |
| GB | 2459874 | A | 11/2009 |
| JP | 1182285 | A | 3/1999 |
| JP | 2004293455 | A | 10/2004 |
| WO | 2006077358 | A1 | 7/2006 |
| WO | 2008089763 | A2 | 7/2008 |
| WO | WO 2011110254 | A2 * | 9/2011 |

OTHER PUBLICATIONS

Extended European Search Report for EP Application No. 10170277.7-1256, dated Jun. 14, 2012, pp. 1-4.

* cited by examiner

METHOD AND SYSTEM FOR REPLACING A SINGLE WIND TURBINE BLADE

BACKGROUND OF THE INVENTION

The subject matter disclosed herein relates to the art of wind turbines and, more particularly, to a method and system for replacing a wind turbine blade.

Wind generators convert energy provided by air currents into electricity. The air currents rotate large rotor blades or propellers that are mounted in nacelles at the top of a tower. The blades spin a rotor relative to a stator to generate an electrical current. The rate of rotation is controlled by varying blade pitch as well as through the use of various braking systems. During high wind conditions, the blade pitch is adjusted to spill wind energy in order to limit rotational speed. Occasionally, the braking system is employed to further prevent the blades from achieving high rotational speeds. During low wind conditions, the blade pitch is adjusted in order to capture as much wind energy as possible.

Over time, the wind generators require maintenance. Debris, hailstones and the like oftentimes impact the blades and cause damage. Replacing a worn or damaged blade generally requires the presence of one or more large ground or sea based cranes. The large cranes are used to retain and lower the blade to a surface such as the ground or a ships deck. In some cases, replacing a blade necessitates that others of the blades be moved to an off balance position. That is, a brake system is activated to position the blade being replaced in a position that is horizontal to ground. In such a case, the others of the blades are off-balance imparting forces to the braking system. In other cases, the blade is placed in a position perpendicular to ground and lowered. In such cases, multiple crews are required to rotate the blade to prevent contact between the surface and a tip portion of the blade that may result in damage.

BRIEF DESCRIPTION OF THE INVENTION

According to one aspect of an exemplary embodiment, a method of replacing a wind turbine blade includes suspending the wind turbine blade from support hub of a wind turbine, connecting one or more cable climbing members between the support hub and the wind turbine blade, and lowering the one or more cable climbing members and the wind turbine blade from the support hub.

According to another aspect of an exemplary embodiment, a system for lowering a wind turbine blade mounted to a support hub includes one or more support members extending between the wind turbine blade and the support hub, one or more jacking members operatively coupled to corresponding ones of the one or more support members, and one or more cable climbing members operatively connected between the support hub and the wind turbine blade. The one or more jacking members are configured and disposed to transfer support of the wind turbine blade from the one or more support members to the one or more cable climbing members.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
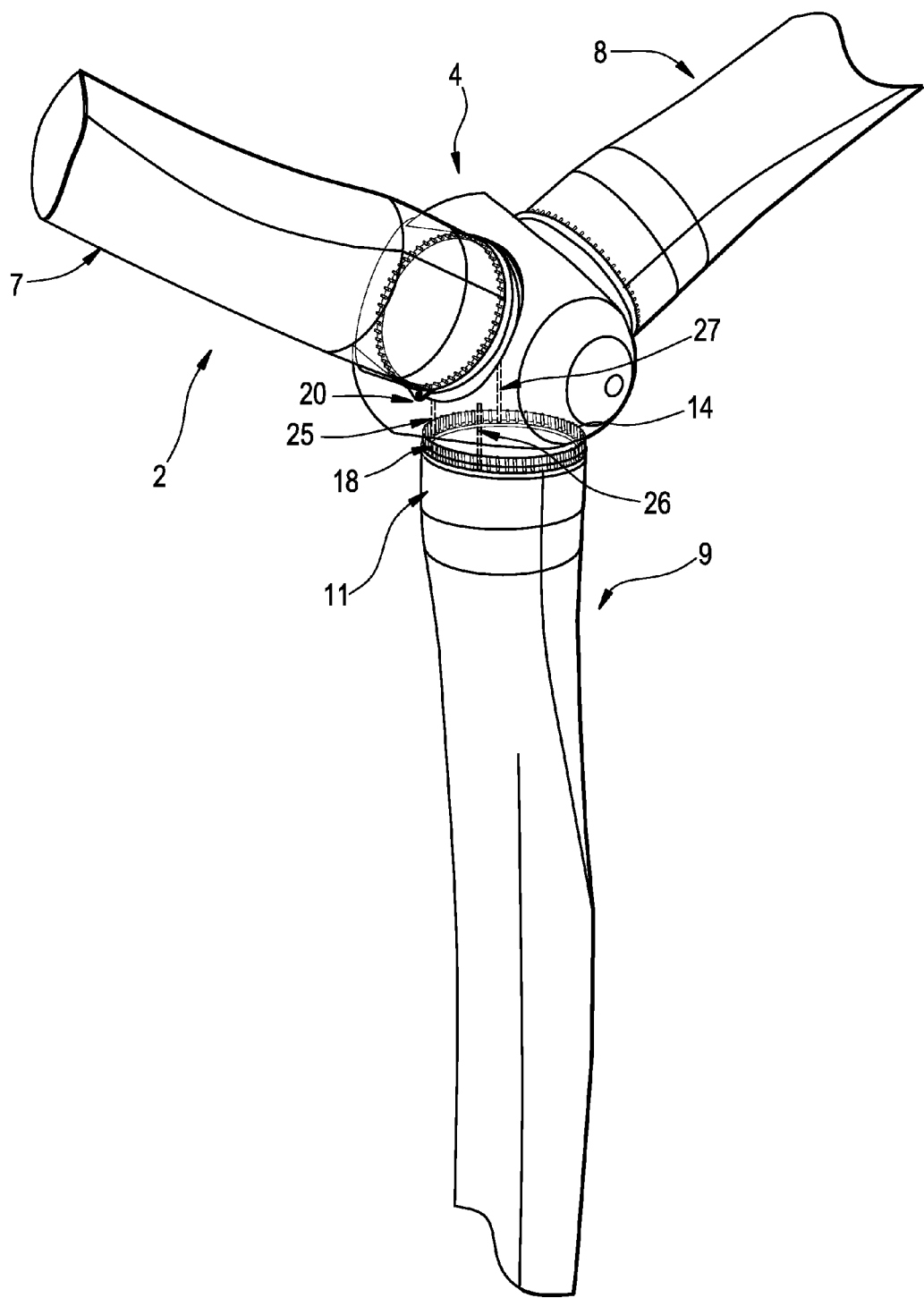
FIG. 1 is a partial perspective view of a wind turbine support hub having a system for effecting replacement of a single wind turbine blade in accordance with an exemplary embodiment.

A wind turbine is indicated generally at 2 in FIG. 1. Wind turbine 2 includes a support hub 4 having attached thereto a first wind turbine blade 7, a second wind turbine blade 8, and a third wind turbine blade 9. Third wind turbine blade 9 includes an end or root portion 11. Of course, first and second wind turbine blades 7 and 8 also include end or root portions (not separately labeled). End portion 11 includes an array of mechanical fasteners, indicated generally at 14, that extend through a corresponding plurality of openings, one of which is shown at 16 (FIG. 3) provided on a blade receiving portion 18 of support hub 4. In accordance with an exemplary embodiment, a blade replacement system, a portion of which is indicated at 20, is provided within support hub 4.

Figure 2:
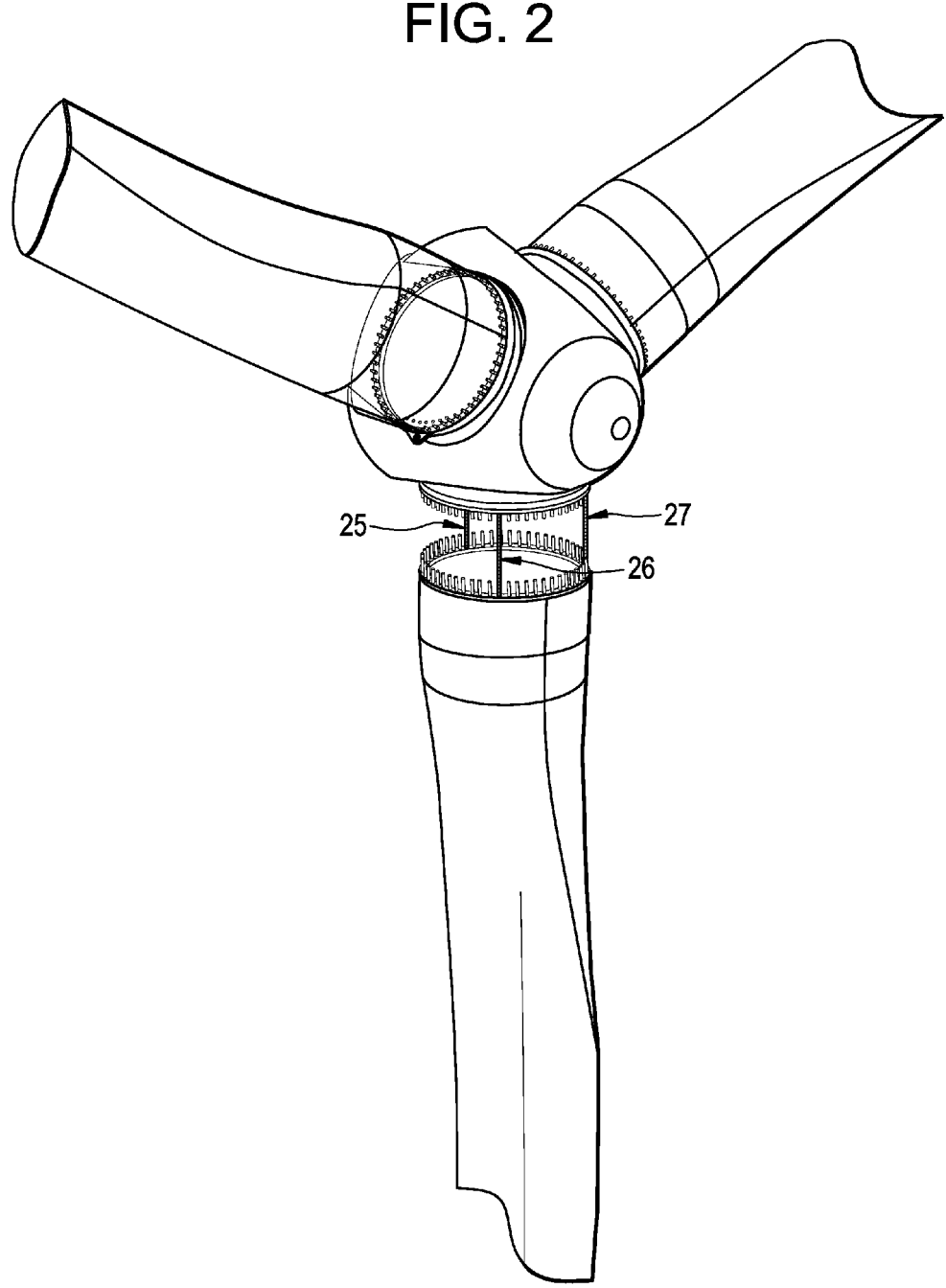
FIG. 2 is a partial perspective view a wind turbine blade of FIG. 1 suspended a first distance from the wind turbine support hub by a plurality of support members.
Figure 3:
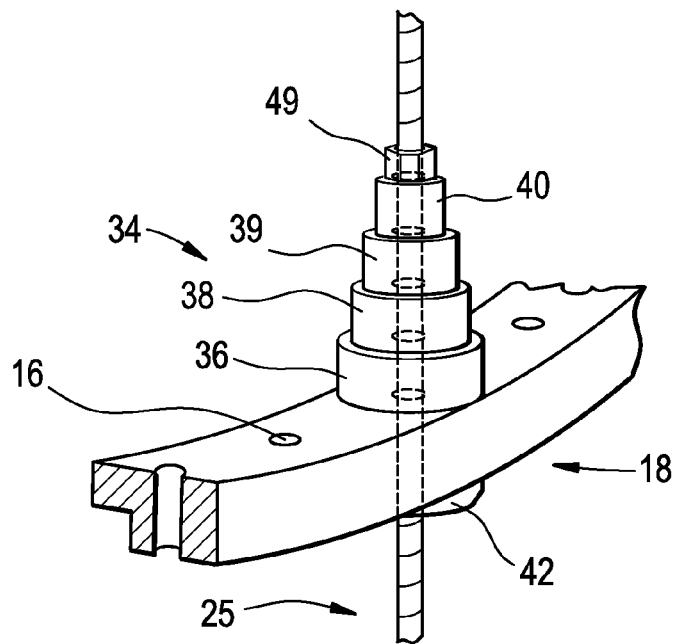
FIG. 3 depicts a support member and hydraulic jack cylinder in an extended configuration in accordance with an exemplary embodiment.

Blade replacement system 20 includes a first support member 25, a second support member 26, and a third support member 27. Support members 25-27 take the form of threaded rods (not separately labeled) that extend through openings 16 in blade receiving portion 18 and engage with threaded openings (not separately labeled) previously provided with fasteners 14 as shown in FIG. 2. Once installed, a hydraulic jacking cylinder 34, illustrated in FIG. 3, is guided over each support member 25-27. Hydraulic jacking cylinder 34 includes a base section 36 that rests on an inner surface (not separately labeled) of blade receiving portion 18 and a plurality of telescoping sections 38-40. Base section 36 and telescoping sections 38-40 include a central passage 42 that receives a corresponding one of support members 25-27.

Figure 4:
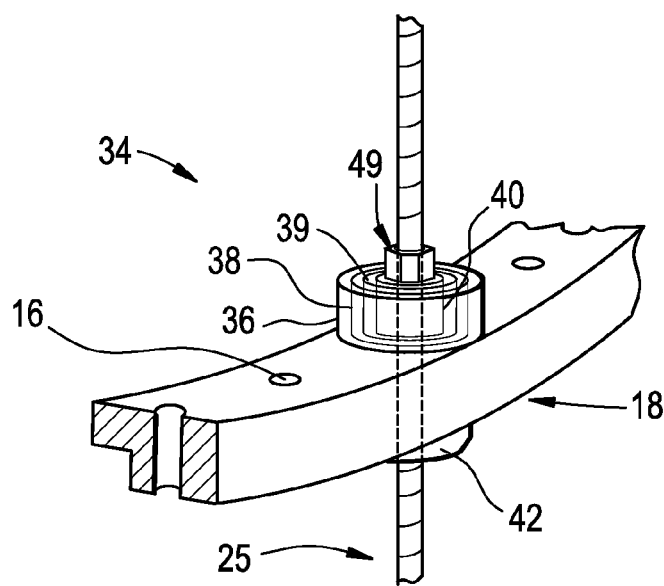
FIG. 4 depicts the hydraulic jack cylinder of FIG. 3 in a retracted configuration.

In FIG. 3, hydraulic jacking cylinder 34 is shown mounted over a free end (not separately labeled) of support member 25. Once in position, telescoping sections 38-40 are extended and a retaining nut 49 is threaded onto first support member 25. Once additional hydraulic jacking cylinders (not shown) are provided on first and second support members 26 and 27, retaining nuts 49 are removed from fasteners 14. At this point, telescoping sections 38-40 are shifted into base section 36 (FIG. 4) separating third wind turbine blade 9 from support hub 4 a first distance. Once separated the first distance, one at a time, retaining nuts 49 are moved away from base section 36 and telescoping sections 38-40 are again extended in preparation for further separation of third wind turbine blade 9 from support hub 4.

Figure 5:
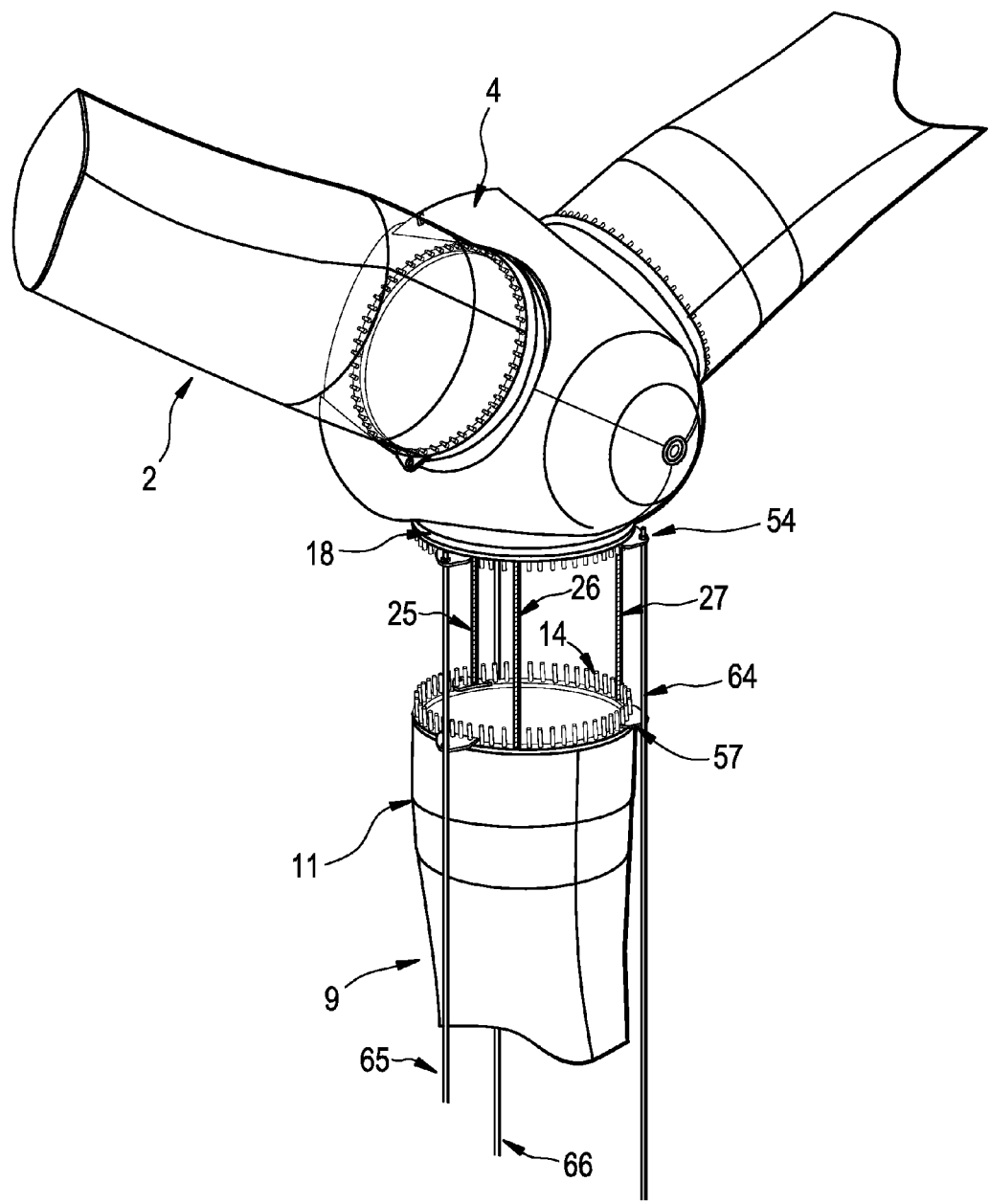
FIG. 5 is a partial perspective view of a plurality of bracket members secured to the wind turbine support hub and a plurality of bracket elements secured to the wind turbine blade.

Blade replacement system 20 also includes a plurality of bracket members, one of which is indicated at 54 and a plurality of bracket elements, one of which is indicated at 57. When separated the first distance, bracket members 54, are mounted to blade receiving portion 18 and bracket elements 57 are mounted to select ones of fasteners 14 on third wind turbine blade 9, as shown in FIG. 5. Each bracket member 54 and bracket element 57 includes mounting structure, shown in the form of openings (not separately labeled). A number of cables 64, 65, and 66, are connected to corresponding ones of bracket members 54. Specifically, one end (not separately labeled) of each cable 64, 65, and 66 is mounted to a corresponding bracket member 54 which another, free end of each cable 64, 65, and 66 is allowed to fall toward ground. By "ground" it should be understood that the free end of each cable 64, 65 and 66 may fall towards ground, a ship's deck, or a body of water depending upon the location of wind turbine 2. Once bracket members 54 and bracket elements 57 are installed, telescoping sections 38-40 of hydraulic jacking cylinders 34 are lowered creating further separation between third wind turbine blade 9 and support hub 4.

Figure 6:
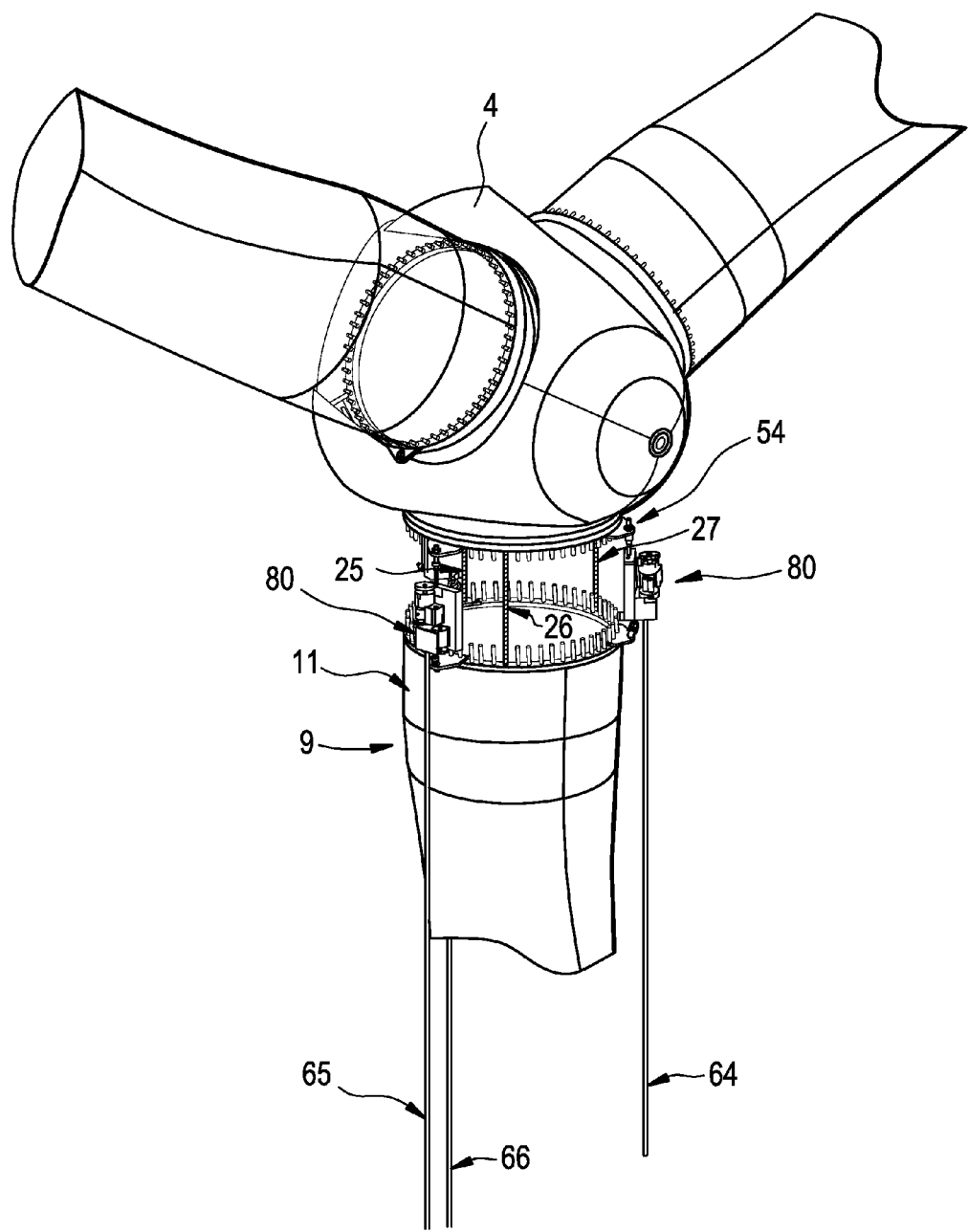
FIG. 6 depicts a plurality of cable climbing members and a plurality of support members supporting the wind turbine blade from the wind turbine support hub.
Figure 7:
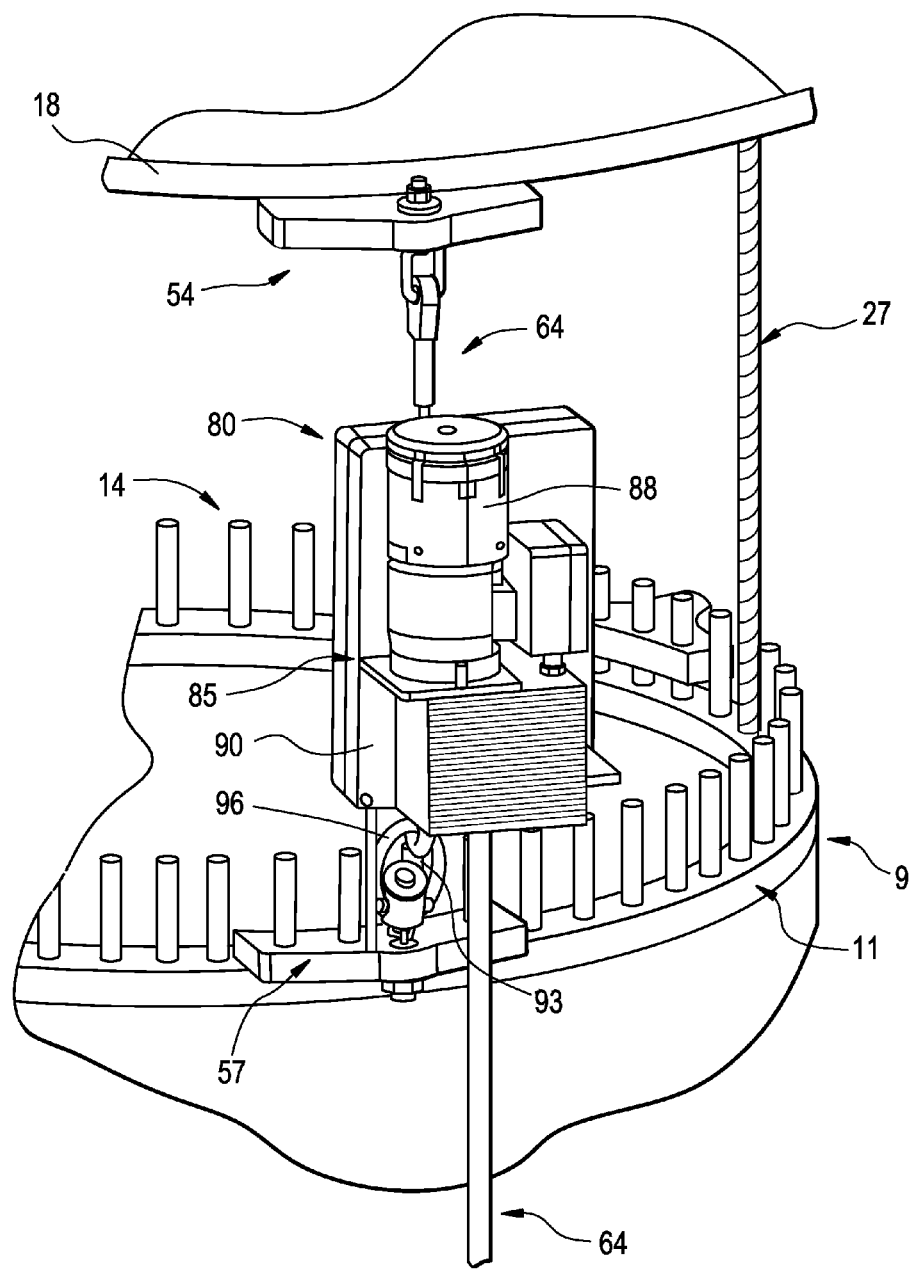
FIG. 7 depicts one of the plurality of cable climbing members supporting the wind turbine blade from the wind turbine support hub.
Figure 8:
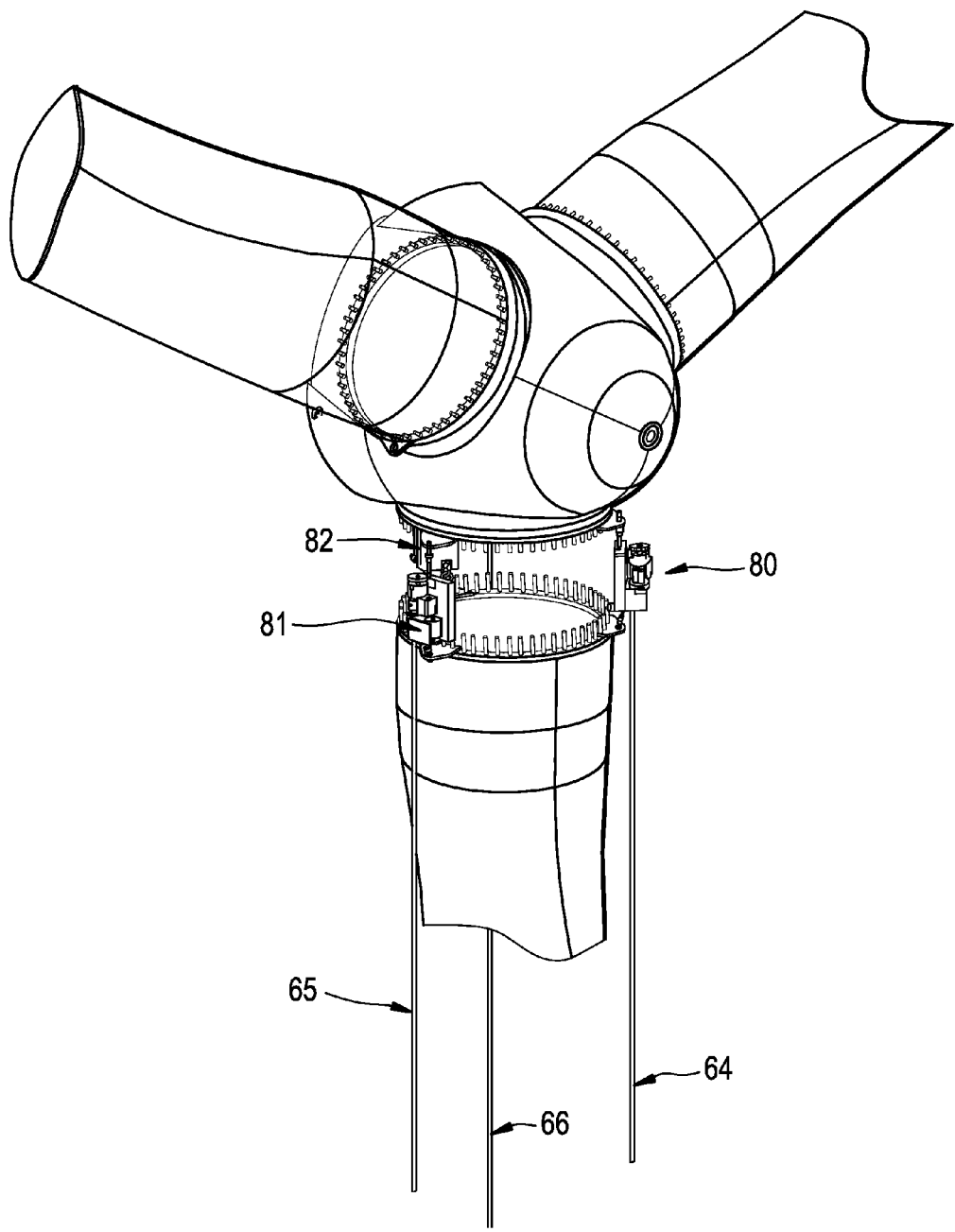
FIG. 8 depicts the wind turbine blade of FIG. 1, supported from the wind turbine support hub through only the plurality of cable climbing members.
Figure 9:
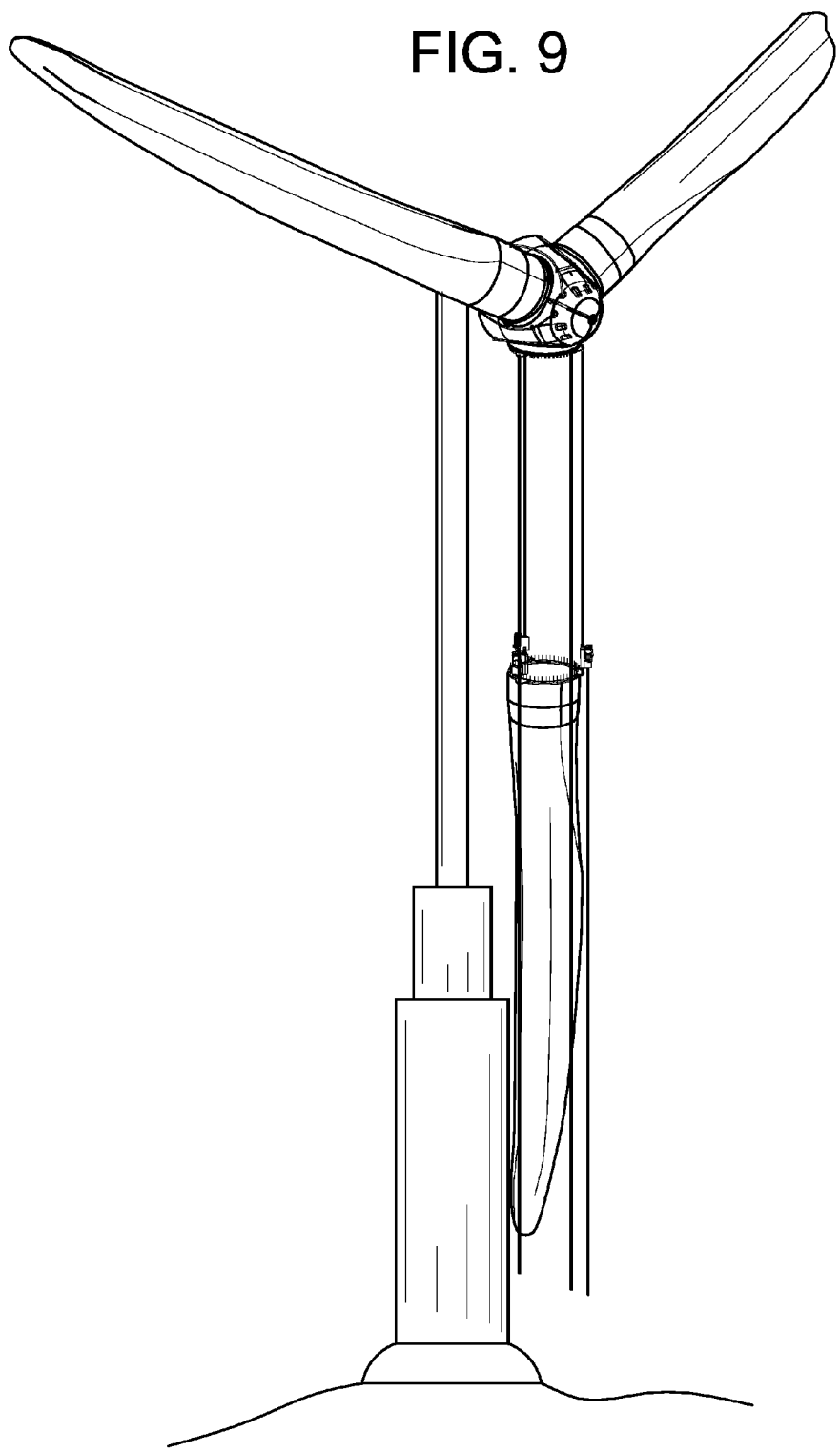
FIG. 9 depicts the wind turbine blade being lowered toward ground.

The additional separation allows for the mounting of cable climbing members. More specifically, blade replacement system 20 further includes a plurality of cable climbing members 80, 81, and 82. Cable climbing members are connected to corresponding ones of cables 64, 65, and 66. Cable climbing members 80, 81, and 82 are controlled so as to climb from the free ends of each cable 64-66 toward bracket members 54, as shown in FIG. 6. As each winch 80, 81, and 82 is similarly formed, a detailed description will follow to FIG. 7 in describing winch 80 with an understanding that cable climbing members 81 and 82 include corresponding structure. Winch 80 includes a housing 85 that supports a motor 88, a cable climbing portion 90 and a shackle 93. Shackle 93 is connected to bracket element 57 through a coupler 96. Once all cable climbing members 80-82 are connected to corresponding bracket elements 57, telescoping sections 38-40 of hydraulic jacking cylinders 34 are further lowered transferring support of third wind turbine blade 9 from support members 25-27 to cable climbing members 80-82 as shown in FIG. 8. At this point, support members 25-27 may be removed, and cable climbing members 80-82 shifted or climbed down cables 64-66 to lower third wind turbine blade 9 from support hub 4 as shown in FIG. 9. The above steps may be revised to raise and install a new wind turbine blade.

At this point it should be understood that the exemplary embodiments describe a system for lowering and raising wind turbine blades without the need for ground-based cranes. The exemplary embodiments employ cable climbing members that are controlled to climb up cables suspended from the support hub and subsequently climb down the cables with the wind turbine blade. It should also be understood that while the support members are described as threaded rods, other structures may be employed. Further, while the wind turbine blade is described as being stepped down through the support members using multiple, successive operations, a single step down may also be employed. Further, it should be understood that a new blade can be raised and secured to the hub by reversing the process described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for lowering a wind turbine blade mounted to a support hub, the system comprising:
   one or more support members extending between the wind turbine blade and the support hub;
   one or more jacking members operatively coupled to corresponding ones of the one or more support members; and
   one or more cable climbing members operatively connected between the support hub and the wind turbine blade, the one or more jacking members being configured and disposed to transfer support of the wind turbine blade from the one or more support members to the one or more cable climbing members.

2. The system according to claim 1, wherein the one or more support members comprise one or more threaded rods operatively connected to the wind turbine blade.

3. The system according to claim 2, wherein the one or more threaded rods are coupled to an end portion of the wind turbine blade.

4. The system according to claim 1, wherein the one or more jacking members comprise one or more hydraulic jacking cylinders.

5. The system according to claim 4, wherein the one or more support members extend through the one or more hydraulic jacking cylinders.

6. The system according to claim 1, further comprising: one or more bracket members mounted to the support hub and one or more bracket elements mounted to the wind turbine blade.

7. The system according to claim 6, wherein the one or more cable climbing members comprise one or more cable climbing cable climbing members.

8. The system according to claim 7, wherein the one or more cable climbing cable climbing members are directly coupled to the one or more bracket elements and indirectly coupled to the one or more bracket members through a cable.

\* \* \* \* \*